Patented Aug. 18, 1925.

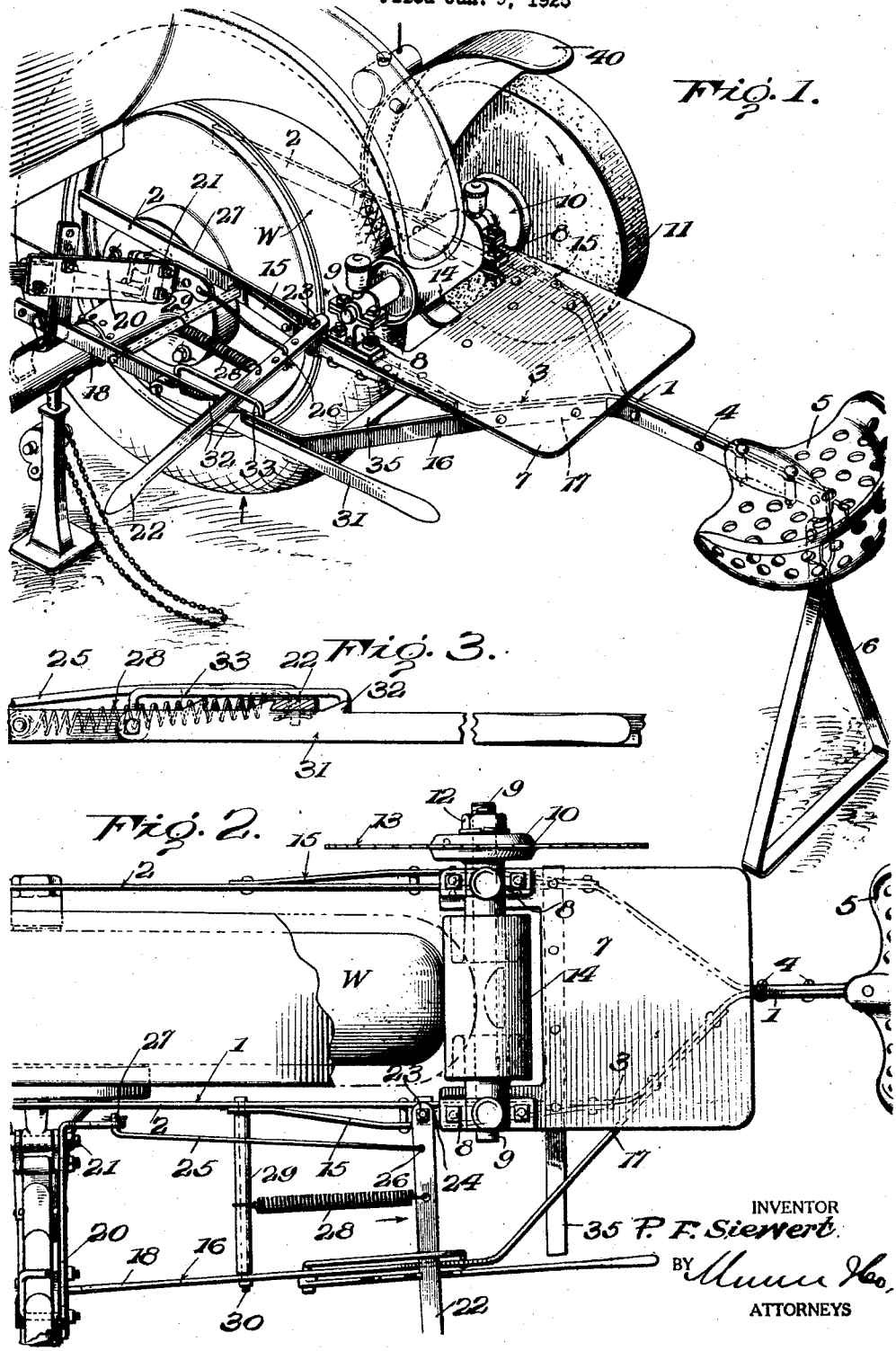

1,550,111

UNITED STATES PATENT OFFICE.

PAUL FREDRICK SIEWERT, OF BRANT, MICHIGAN.

POWER TAKE-OFF.

Application filed January 9, 1925. Serial No. 1,423.

*To all whom it may concern:*

Be it known that I, PAUL FREDRICK SIEWERT, a citizen of the United States, and a resident of Brant, in the county of Saginaw and State of Michigan, have invented certain new and useful Improvements in Power Take-Offs, of which the following is a specification.

This invention relates to a power take-off especially adapted for use on automobiles such as the "Ford" automobile.

An object of the invention is the provision of a power take-off of this character which may be conveniently organized with the rear wheel of the automobile in such a manner as to derive a grinding wheel, a circular saw or any other similar device from the engine of the automobile.

A further object resides in the provision of a power take-off having the advantages mentioned and which is readily and easily controllable, which is simple and durable in construction and which is comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing one embodiment of the invention in use to drive a grinding wheel, Figure 2 is a plan view of the machine shown in Figure 1 but illustrating the same in use to drive a circular saw, and Figure 3 is a detail view partly in section and partly in elevation illustrating the control latch for the operating lever.

Referring to the drawings the numeral 1 designates generally the main frame which is made up of a pair of metallic bars 2 extending in spaced parallel relation for the major portion of their lengths. At one end the bars converge as at 3 and are riveted together, as at 4 for connection with a seat 5. The seat 5 is supported on the bars 4 and on a standard 6 which is pivoted to the bars 4 and which may be swung to a vertical supporting position or to a substantially horizontal inactive position.

A plate 7 is suitably fastened to the bars 2 of the main frame and on this plate bearings 8 are fixed. A drive shaft 9 is rotatably mounted in the bearings 8 and this drive shaft projects beyond one of the bearings as clearly shown in Figure 2. On the projecting portion of the drive shaft collars 10 are fitted and are fastened to clamp between them the grinding wheel 11. A nut 12 prevents accidental displacement of the outermost collar.

In lieu of the grinding wheel 11 a circular saw 13 may be employed as illustrated to advantage in Figure 4.

A pulley or driven friction gear 14 is fixed to the shaft 9 between the bearings 8 and is designed to be engaged with and driven by one of the rear wheels W of the automobile.

The side bars 2 of the main frame are braced by means of bracing strips 15. These side bars are designed to span the rear wheel of the automobile and to rest one on the hub and the other on the rear axle housing.

The support of the main frame is enhanced and the frame is guided in its movements by means of a bracing frame 16 which consists of a bar of metal having a portion 17 fastened to one of the side bars 2 and having a portion 18 slidably fitted through a guide provided therefor in a hanger 19 carried by a bracket 20 fixed to the shackle bolt 21, ordinarily provided on the rear of a "Ford" automobile and to the rear spring. The main frame thus supported and mounted may be shifted the distance necessary to engage and disengage the pulley 14 and the rear wheel W and for this purpose an operating lever 22 is provided and is pivotally connected as at 23 to a block 24 fastened between one of the side bars 2 and one of the braces 15.

A pull rod 25 is pivotally connected, as at 26, with the lever 22 and is pivotally and positively connected as at 27 with the bracket 20. A retractile coil spring 28 is connected with the lever 22 and with a spacing sleeve 29. The spacing sleeve 29 is mounted on a bolt 30 which extends between the bracing frame 18 and one of the bars 2 of the main frame to maintain these parts in spaced relation. Coil spring 28 urges the operating lever to such position as to tend to move the frame 1 to such position as to disengage the pulley 14 and the wheel W.

By pulling the lever 22 in a counter-clockwise direction as viewed in Figures 1 and 2 it swings about the pull rod 25 as a fulcrum and pushes the frame 1 toward the wheel W to bring the pulley 14 into engagement with the wheel W. The lever 22 is releasably held in adjusted position by means of a latch bar 31 mounted on the bracing frame 18 and having teeth 32 engageable with the operating lever 22. The latch bar 31 is held up against the operating lever 22 by friction or by an independent spring catch means if the latter expedient is considered advisable. In order to prevent the operating lever 22 from being flexed upwardly a guide 33 is provided for this operating lever.

In order to enhance the rigidity of the main frame and of the bracing frame a transverse angle iron 35 is suitably fastened to the side bars of the main frame and to the bracing frame.

When the grinding wheel 11 is employed a guard 40 may be provided therefor.

In use, the rear end of the automobile is jacked up as shown in Figure 1 and the seat is supported on its standard. The automobile engine having been started and geared to the rear wheels, the heel W operates to drive the pulley 14 and consequently the grinding wheel or the circular saw 13 as the case may be.

What I claim is:

1. In a power take-off for use with automobiles having a rear driven wheel and a rear axle housing associated therewith, a main frame including a pair of bars designed to span the wheel and to be slidably supported on the hub of the wheel and on the rear axle housing, a bracket mounted on the axle housing and having a guide opening, a bracing frame connected to the main frame and having a portion slidably fitted in the guide opening, a shaft rotatably mounted on the main frame, a driven gear element connected to the shaft and engageable with the rear wheels of the vehicle, and means for shifting the main frame to disengage the driven gear element with the rear wheel.

2. In a power take-off for use with automobiles having a rear driven wheel and a rear axle housing associated therewith, a main frame including a pair of bars designed to span the wheel and to be slidably supported on the hub of the wheel and on the rear axle housing, a bracket mounted on the axle housing and having a guide opening, a bracing frame connected to the main frame and having a portion slidably fitted in the guide opening, a shaft rotatably mounted on the main frame, a driven gear element connected to the shaft and engageable with the rear wheels of the vehicle, means for shifting the main frame to disengage the driven gear element with the rear wheel, and comprising an operating lever pivotally connected to the main frame, a pull rod pivotally connected to the bracket and to the lever, spring means for biasing the position of the lever, and releasable means for maintaining the lever in adjusted position.

3. In a power take-off for use with automobiles having a rear axle housing and a rear driven wheel, a main frame including a pair of side bars adapted to be slidably supported at one end of the hub and on the rear axle housing, a seat mounted on said main frame at the end thereof opposite its support on the hub and axle housing, a pivoted standard supporting the seat, a bracket fixed to the rear axle housing and having a guide opening, a bracing frame connected with one of the side bars of the main frame and having a portion slidably fitted in said guide opening, a shaft rotatably mounted on the main frame, a driven gear element fixed to the shaft and engageable with the wheel, and means for shifting the main frame to engage and disengage the driven gear element with the wheel.

PAUL FREDRICK SIEWERT.